Nov. 18, 1952     J. M. BASH     2,618,577
METHOD OF DEGREASING AND VIBRATORY DEGREASER
Filed Sept. 6, 1946
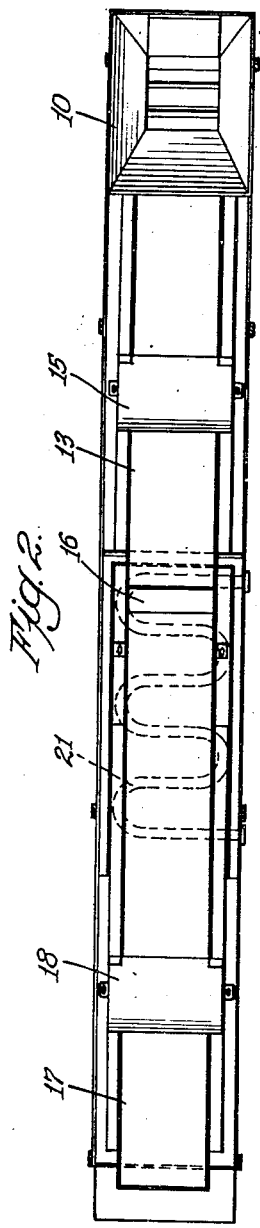
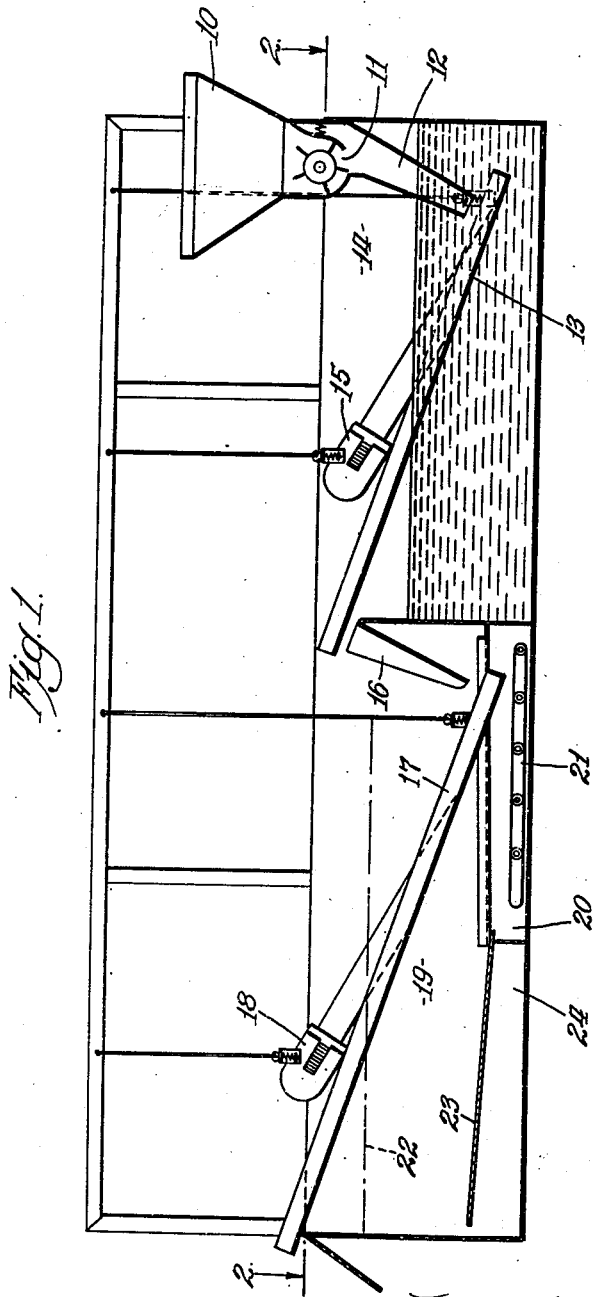
Inventor
John M. Bash
By
Stone, Altman & Bisson
Attys.

Patented Nov. 18, 1952

2,618,577

UNITED STATES PATENT OFFICE 2,618,577

METHOD OF DEGREASING AND VIBRATORY DEGREASER

John M. Bash, Chicago, Ill.

Application September 6, 1946, Serial No. 695,150

11 Claims. (Cl. 134—25)

This invention relates to degreasing apparatus and methods and is particularly applicable to the degreasing of large quantities of more or less finely divided material such as steel shavings or chips.

In the machining of steel parts it is usual to employ an oil coolant such, for example, as lard oil. This, of course, leaves an oily film on the chips or shavings which, unless removed, renders them unfit for re-use in steel production—the reason being that the oily coating is a hydrocarbon which, when subjected to furnace heat, produces a free carbon residue which is detrimental.

Steel scrap in the form of machine tool shavings or chips bring a very low price, even when thoroughly degreased, and for that reason it has been found to be uneconomical to degrease such material with the apparatus and methods heretofore known.

One of the principal objects of this invention is to provide means and methods whereby finely divided steel scrap can be thoroughly degreased so economically as to render the operation profitable, or, in other words, to make it economically feasible to salvage the hundreds of thousands of tons of steel in the form of shavings and chips which heretofore have been wasted annually because of the prior prohibitive cost of removing oily coolant residues. However, it should be mentioned in passing that the utility of my invention is not limited to the salvaging of scrap although its economic aspects are more evident in the treatment of large quantities of scrap material than would be the case if the invention were utilized for degreasing more valuable material where the unit cost of degreasing is, by comparison, insignificant even with ordinary equipment and methods.

It has been attempted in the past to degrease steel scrap by passing it in a continuous stream on a conveyor belt through a solvent bath, both liquid and vapor, but the results have not been satisfactory for the reason that the degreasing has either not been sufficiently thorough or, if sufficiently thorough, has been too slow and costly. I have discovered that the unsatisfactory results of such trials were due to the fact that much of the material being processed was so closely compact that the degreasing agent would not adequately penetrate all the interstices of the mass; and this was particularly true where the degreasing agent was in the vapor state, as, for example, vaporous tetrachloroethylene—which is one of the most efficient degreasing solvents. As a rule, such vapors condense the instant they contact the mass of metal chips or shavings, and, consequently, they fail to penetrate, in sufficient quantity, to the interior of the mass; and, what is more, if the mass of material on the conveyor belt is of any substantial thickness the condensate which forms on the upper surface thereof trickles down through the mass carrying with it the dissolved grease from the upper chips and shavings and is accordingly too saturated with grease to do a good job on the lower part of the mass.

I have made the simple but important discoverey that if the mass of steel scrap is vigorously vibrated during the course of its transit through the cleaning chamber the discrete parts of the mass, both large and small, are all thoroughly exposed to the degreasing agent, and where the agent is vaporous, each particle of scrap becomes a condensing medium and, consequently, is washed by fresh clean liquid solvent and thus thoroughly cleansed. As a result of this simple but effective improvement I am able to thoroughly degrease steel scrap so rapidly and in such volume that it has become economically feasible to do so even when the market price of the product is very low.

Insofar as I have been able to ascertain, the inventive idea of vigorously vibrating a mass of material such as steel scrap in a degreasing medium for the purpose of rendering more speedy and effective the degreasing operation is broadly new irrespective of other factors entering into the over-all operation; but I have found that the most efficient practice in carrying out my invention consists in continuously feeding the scrap material through the degreasing medium on a suitable conveyor which is continuously vibrated to such an extent as to cause the material being processed to be thoroughly agitated during the whole time it is passing through the degreasing chamber or chambers. Of course it is not of the essence of my invention that the vibration be uninterrupted or that it continue throughout the degreasing operation, but such is the better practice.

My invention contemplates not only the broad concept stated above but certain lesser features which I have developed in seeking to realize maximum efficiency. I have found, for example, that I can employ to advantage a sloping vibratory conveyor, of pre-existing type, which, at one and the same time, advances the material through the degreasing medium and keeps it in a state of vigorous vibration. I have also found that the greatest efficiency may be achieved by passing the material to be processed first through a bath of liquid solvent, which removes the bulk of the grease, and thereafter passing it through a chamber containing a vaporous degreasing medium. Preferably, the material being processed is kept in a continuous state of vibration in the liquid phase as well as the vapor phase of the degreasing operation, but it is not strictly essential to the practice of my invention that the material be vibrated during the liquid phase.

In the drawing which accompanies this specification:

Figure 1 is a more or less schematic showing, in elevation, of equipment for carrying out the invention; and Figure 2 is a plan view of said equipment.

The material to be processed is dumped into a hopper 10 from which it is discharged downwardly, preferably at a constant rate, by means of a rotary feeder 11. The discharged material slides down a chute 12 into the lower end of a sloping vibratory conveyor 13. This comprises a channel-shaped member or trough which is closed at the lower end and open along the top. The bottom of the trough is imperforate and has a smooth upper surface. The conveyor 13 is situated in a tank or chamber 14 which is partly filled with a liquid degreasing solvent such, for example, as tetrachloroethylene or trichloroethylene. A mechanism 15 which may be electrically operated is attached to the conveyor 13 and vibrates the same in such manner as to cause the material on the chute to move upwardly thereon, continuously. Vibratory conveyors of this character are well known and need not be further described here. The vibration not only causes the material to progress upwardly along the conveyor in a steady stream but also serves to keep the material in a continuous state of vibratory agitation which, as before explained, increases the efficacy and speed of the degreasing operation.

The bulk of the oily coating on the material in process is removed in chamber 14, but there still remains a residue to be removed in the succeeding stage of the operation.

The material, after being washed in chamber 14, moves to the upper end of conveyor 13 where it is discharged by way of a chute 16 into the bottom end of a second vibratory conveyor 17 and it is vibrated by a mechanism 18 in all respects the same as vibrator mechanism 15.

Conveyor 17 is disposed, as shown, in a chamber or tank 19 with its upper end projecting over the top edge of the tank for the purpose of discharging the degreased material.

At the bottom of chamber 19 is a sump 20 in which is situated a suitable heater 21—preferably an electric heater.

Sump 20 is filled or partially filled with a vaporizable degreasing solvent such as tetrachloroethylene, the vapor of which has a density of 1.608. Heater 21 serves to vaporize the liquid solvent and is so regulated thermostatically as to maintain a solvent vapor atmosphere in chamber 19 up to some appropriate level such as that indicated by broken line 22. Suitable means for maintaining the vapor level substantially constant are well known in the art and reference may be had to U. S. Patent No. 2,253,579 for details of an operative arrangement for such purposes.

The material on conveyor 17 below level 22 is immersed in solvent vapor and being continuously agitated by the vibration of the conveyor all the particles thereof are brought into contact with the vapor with the result that a very thorough and fast degreasing job is accomplished.

Upon coming into contact with the cold scrap on conveyor 17 the vapor condenses and dissolves whatever oil remains on the scrap, and the used solvent flows down to the lower end of the conveyor where it is discharged into sump 20 where it is reheated and again vaporized, and distilled for the purpose of removing the accumulated grease and dirt. I have not shown any provision for returning the recovered solvent to sump 20 because such provisions are common in the art and well understood.

Any condensate which may drip off conveyor 17 at points not directly above sump 20 will fall onto a sloping plate or floor 23 and flow therealong into sump 20. Beneath plate 23 is a clean distillate sump 24 from which the clean distillate can be drawn off whenever it may be desired to empty the tank.

The frequency and amplitude of vibration imparted to the conveyors is not critical except that they must be sufficient to thoroughly agitate the material so as to ensure exposure of all parts of the mass to the vapor. The frequency and amplitude commonly employed in the operation of vibratory conveyors, namely, 60 cycles per second, is satisfactory.

The maximum rate at which steel scrap may be fed through the system depends to a large extent upon the nature of the scrap and particularly its fineness. If the bulk of the scrap consists of small particles, the operation may have to be slowed down whereas with coarse scrap it may be speeded up.

I claim:

1. The method of degreasing masses of small particles clogged with oil and dirt such as metal chips and shavings which comprises the steps of distributing a comparatively thin layer of the particles on a plate immersed in a degreasing fluid, and of vibrating the plate at a high frequency in the neighborhood of sixty vibrations a second.

2. The method of degreasing masses of small particles clogged with oil and dirt such as chips and shavings which comprises the steps of vibrating a plate at a comparatively high frequency in the neighborhood of sixty vibrations a second and with a substantial component of horizontal motion so that particles will move from a first end of the plate to the opposite end, the first end of said plate being immersed in a degreasing fluid, and of feeding chips and shavings onto the first end of the plate.

3. The method of degreasing masses of small particles clogged with oil and dirt such as metal chips and shavings which comprises the steps of vibrating a plate at a comparatively high frequency in the neighborhood of sixty vibrations a second and with a substantial component of horizontal motion so that the articles will move from a first end of the plate to the opposite end, portion of said plate being immersed in a degreasing liquid, of feeding chips and shavings onto the first end of the plate, and of catching particles discharged by the first plate on a second plate similarly vibrating but immersed in a solvent vapor.

4. The method of degreasing masses of small particles clogged with oil and dirt such as metal chips and shavings which comprises the steps of vibrating an inclined plate having its lower end immersed in a solvent liquid at a comparatively high frequency in the neighborhood of sixty vibrations a second and with substantial components of horizontal and vertical motion, so that particles will move from the lower end to the upper end of the plate, and of feeding continuously onto the lower end of the plate sufficient chips and shavings to provide a thin layer of chips and shavings moving upwardly on the plate.

5. The method of degreasing masses of small particles clogged with oil and dirt such as metal chips and shavings which comprises the steps of vibrating an inclined plate having its lower end immersed in a solvent liquid at a comparatively high frequency in the neighborhood of sixty vibrations a second and with substantial components of horizontal and vertical motion, so that particles will move from the lower end to the upper end of the plate, of feeding continuously onto the lower end of the plate sufficient chips and shavings to provide a thin layer of chips and shavings moving upwardly on the plate, and guiding the chips discharged from the upper end of the inclined plate onto the lower end of a similarly inclined, similarly vibrated plate positioned in a solvent vapor.

6. Degreasing apparatus for cleaning masses of small particles clogged with oil and dirt such as metal chips and shavings comprising a tank having a bottom and side walls, an inclined imperforate plate having a smooth upper surface and mounted in the tank so that one end is near the bottom of the tank and the other end is over the side of the tank, and a high frequency vibrator reciprocating in the neighborhood of 60 vibrations a second operably connected to said plate so as to provide substantial components of horizontal and vertical movement whereby particles will move up the plates.

7. Degreasing apparatus for cleaning masses of small particles clogged with oil and dirt such as metal chips and shavings comprising a tank having a bottom and side walls, an inclined imperforate plate having a smooth upper surface and having two side walls and one end wall to form an open-ended trough mounted in the tank with the closed end near the bottom and the open end over the tank edge, a high frequency vibrator reciprocating in the neighborhood of 60 vibrations a second operably connected to said plate so as to provide substantial components of horizontal and vertical movement whereby particles will move up the plate, and a chute for masses of small particles opening onto the lower end of said plate.

8. Degreasing apparatus for cleaning masses of small particles clogged with oil and dirt such as metal chips and shavings comprising a tank having a bottom and side walls, an inclined imperforate plate having a smooth upper surface and mounted in the tank so that one end is near the bottom of the tank and the other end is over the side of the tank, a high frequency vibrator reciprocating in the neighborhood of 60 vibrations a second operably connected to said vertical plate so as to provide substantial components of horizontal and vertical movement whereby particles will move up the plates, a second tank adjacent the first tank along the delivery side of the plate in the first tank, a similar plate driven by a similar high frequency vibrator mounted in the second tank with its lower end beneath the delivery end of the plate in the first tank and with its own upper end over the edge of its tank, and a heating element mounted in the bottom of the second tank.

9. Degreasing apparatus for cleaning masses of small particles clogged with oil and dirt such as metal chips and shavings comprising a tank having a bottom and side walls, an inclined imperforate plate having a smooth upper surface and having two side walls and one end wall to form an open-ended trough mounted in the tank with the closed end near the bottom and the open end over the tank edge, a high frequency vibrator reciprocating in the neighborhood of 60 vibrations a second operably connected to said plate so as to provide substantial components of horizontal and vertical movement whereby particles will move up the plate, a chute for masses of small particles opening onto the lower end of said plate, a second tank adjacent the first tank along the delivery side of the trough in the first tank, a similar trough driven by a similar high frequency vibrator mounted in the second tank with its lower end beneath the delivery end of the trough in the first tank and with its own upper end over the edge of its tank, and a heating element mounted in the bottom of the second tank.

10. Degreasing apparatus for cleaning masses of small particles clogged with oil and dirt such as metal chips and shavings comprising a tank having a bottom and side walls, and a high frequency vibratory conveyor reciprocating in the neighborhood of 60 vibrations a second suspended in said tank so that its lower end is close to the bottom of the tank and its upper end is above one side of the tank whereby vibration of the conveyor will not be communicated to the tank itself the bed of said conveyor being an imperforate plate having a smooth upper surface.

11. Degreasing apparatus for cleaning masses of small particles clogged with oil and dirt such as metal chips and shavings comprising a tank having a bottom and side walls, an imperforate plate having a smooth upper surface and mounted in the tank with one surface inclined upwardly, and a high frequency vibrator reciprocating in the neighborhood of 60 vibrations a second operably connected to said plate.

JOHN M. BASH.

REFERENCES CITED

The following references are of record in the file of this patent:

UNITED STATES PATENTS

| Number | Name | Date |
| --- | --- | --- |
| 1,248,214 | Walker | Nov. 27, 1917 |
| 1,743,466 | Maag | Jan. 14, 1930 |
| 2,101,840 | Dinley | Dec. 14, 1937 |
| 2,166,644 | Severin | July 18, 1939 |
| 2,183,896 | Rupp | Dec. 19, 1939 |
| 2,256,700 | Armstrong | Sept. 23, 1941 |
| 2,319,901 | Hall | May 25, 1943 |
| 2,426,398 | Lathrop | Aug. 26, 1947 |